US008472530B2

(12) United States Patent  (10) Patent No.: US 8,472,530 B2
Kim et al.  (45) Date of Patent: Jun. 25, 2013

(54) SELECTIVE ERROR CONCEALMENT METHOD AND APPARATUS FOR MOVING PICTURE FRAME

(75) Inventors: Yong-Deok Kim, Seoul (KR); Young-Hun Joo, Yongin-si (KR); Kwang-Pyo Choi, Anyang-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1251 days.

(21) Appl. No.: 12/313,559

(22) Filed: Nov. 21, 2008

(65) Prior Publication Data

US 2009/0141166 A1 Jun. 4, 2009

(30) Foreign Application Priority Data

Nov. 22, 2007 (KR) .................. 10-2007-0119862

(51) Int. Cl.
*H04N 7/18* (2006.01)
(52) U.S. Cl.
USPC ............ 375/240.27; 375/240.25; 375/240.26
(58) Field of Classification Search
USPC ....................... 375/240.01–240.29
See application file for complete search history.

(56) References Cited

U.S. PATENT DOCUMENTS

2008/0263616 A1* 10/2008 Sallinen et al. ............... 725/131

* cited by examiner

*Primary Examiner* — Andy Rao
(74) *Attorney, Agent, or Firm* — Cha & Reiter, LLC

(57) ABSTRACT

Disclosed is a selective frame error concealment method for a moving picture frame, the method including the steps of determining if an erroneous frame corresponds to one among a predetermined number of frames received after an I frame when the erroneous frame is received during reception of moving picture frames, determining if the number of consecutive erroneous frames is greater than a threshold value when the erroneous frame does not correspond to one among the predetermined number of frames received after the I frame, using an error concealment technique when the number of consecutive erroneous frames is equal to or less than the threshold value; and displaying a frame, which has been received without error before the erroneous frame, until receiving a new I frame, either when the erroneous frame corresponds to one among the predetermined number of frames received after the I frame, or when the number of consecutive erroneous frames is greater than the threshold value.

17 Claims, 5 Drawing Sheets
(3 of 5 Drawing Sheet(s) Filed in Color)

... F$_{K-1}$  F$_K$  F$_{K+1}$  F$_{K+2}$ ...

SELECTIVE ERROR CONCEALMENT METHOD AND APPARATUS FOR MOVING PICTURE FRAME

CLAIM OF PRIORITY

This application claims the benefit of the earlier filing date, pursuant to 35 USC 119, to that patent application entitled "Selective Error Concealment Method And Apparatus For Moving Picture Frame" filed with the Korean Intellectual Property Office on Nov. 22, 2007 and assigned Serial No. 2007-119862, the contents of which are incorporated herein by reference.

BACKGROUND OF THE INVENTION

1. Field of the Invention

The present invention relates to moving picture data decoding, and more particularly to a selective error concealment (EC) method and apparatus for selectively concealing errors in frames upon decoding a moving picture.

2. Description of the Related Art

In general, most moving picture coding standards, which include H.263, H.264 and MPEG-4, established as international standards, employ efficient image compression schemes, such as variable length coding (VLC), spatial and motion prediction, etc. However, the variable length coding scheme has a problem in that it is very vulnerable to a noisy channel environment. For example, even a few bit errors may cause a loss of synchronism during image decoding. Also, a prediction coding scheme leads to error propagation throughout the whole image. Accordingly, errors occurring during channel transmission and storage medium recording/reading exert a negative effect on the quality of a restored image.

In order to effectively cope with such inevitable transmission errors, research has been conducted on error concealment (EC) techniques for minimizing damage due to errors occurring in a transmission environment, as well as coding schemes robust to errors.

Among a variety of EC techniques, a post-processing technique of assigning responsibility for EC to a decoder is in widespread use. The post-processing technique is a scheme for recovering error information by using such a characteristic where, in the case of a natural image, spatially or temporally adjacent pixels change smoothly. According to the post-processing technique, an erroneous block is recovered in units of pixels or macro blocks by using a pixel value or motion vector (MV) of a block neighboring the erroneous block.

FIG. 1 is a view illustrating subsequent frames output after an error occurs in a frame during decoding of a moving picture. Due to a compression scheme using correlation with a previous frame, a frame ($F_{K+1}$) transmitted after a frame "$F_K$," in which an error occurs, is rendered in a form where the error in the previous frame is propagated. As a result, although an error occurs only in the frame "$F_K$," the error in the frame "$F_K$" is propagated into frames "$F_{K+1}$" and "$F_{K+2}$" transmitted after the frame "$F_K$," so that it becomes almost impossible to identify the original images within frames "$F_{K+1}$" and "$F_{K+2}$."

Moving pictures for terrestrial digital multimedia broadcasting (DMB), which has recently been activated, are implemented though a method of constructing one frame using one slice based on an H.264 compression scheme. The slice-by-slice compression method is designed to be robust to errors. According to the slice-by-slice compression method, when an error occurs within a slice, it becomes impossible to decode the entire slice. This means that error occurs frame by frame.

An error occurring in an image in which one frame is constructed using one slice is treated as an error of an entire slice, thereby causing a more serious problem in the image quality of a moving picture, as compared with the conventional pixel-by-pixel or block-by-block errors. In addition, since an erroneous region corresponds to the entire frame, it is impossible to apply the conventional block-based EC techniques.

Currently, mobile broadcasting, such as terrestrial DMB and satellite DMB, generally uses a frame freeze technique, in which, when an error exists in a moving picture of a received broadcast, an image before the error is output in the form of a still image until a new I frame is received.

FIG. 2 is a view illustrating frames output after an error occurs in a frame when a moving picture is decoded using a general frame freeze technique. As shown in FIG. 2, according to the frame freeze technique, since a frame is correctly transmitted before an error occurs in a frame is transmitted in place of the erroneous frame, it is impossible to accurately transmit image information to the user. Especially, when an error occurs in a frame, the frame freeze technique is to output a prior non-error frame on a position of the frame in which the error occurs, a user is unable to know information of the erroneous frame. In the case of general terrestrial DMB, since one I frame is received every 30 frames, when a reception error occurs, there is no choice but to discard all received video frame information until the next I frame is received, so that a viewer of mobile broadcasting has no alternative but to view a still image.

SUMMARY OF THE INVENTION

Accordingly, the present invention provides a selective frame error concealment method and apparatus for providing moving pictures of such quality that the moving pictures continue without interruption when an error occurs during moving picture transmission.

In accordance with an aspect of the present invention, there is provided a selective frame error concealment method for a moving picture frame, the method including the steps of determining if an erroneous frame corresponds to one among a predetermined number of frames received after an I frame when the erroneous frame is received during reception of moving picture frames, determining if the number of consecutive erroneous frames is greater than a preset threshold value when the erroneous frame does not correspond to one among the predetermined number of frames received after the I frame, using a preset error concealment technique when the number of consecutive erroneous frames is equal to or less than the threshold value; and displaying a frame, which has been received without error before the erroneous frame, until receiving a new I frame, either when the erroneous frame corresponds to one among the predetermined number of frames received after the I frame, or when the number of consecutive erroneous frames is greater than the threshold value.

In accordance with another aspect of the present invention, there is provided an apparatus for concealing a frame error upon decoding of a moving picture, the apparatus including a frame decoding unit for decoding a bit stream of an input encoded frame, and determining if an error occurs in the decoded frame, a buffer unit for temporarily storing a previously decoded previous frame and a currently decoded current frame, which have been received from the frame decoding unit; a controller for controlling each component during performance of a frame error concealment function, a frame error concealment unit for generating a recovery frame through use of a previously normally received frame when an error occurs in an input image frame and an output unit for outputting an image frame input from the buffer unit, without change, when the image frame is input without error, and outputting the recovery frame generated by the frame error concealment unit when an error occurs in an input frame, wherein the controller determines if an erroneous frame corresponds to one among a predetermined number of frames received after an I frame when the erroneous frame is received during reception of moving picture frames, determines if the number of consecutive erroneous frames is greater than a preset threshold value when the erroneous frame does not correspond to one among the predetermined number of frames received after the I frame, uses a preset error concealment technique when the number of consecutive erroneous frames is equal to or less than the threshold value, and displays a frame, which has been received without error before the erroneous frame, until receiving a new I frame, either when the erroneous frame corresponds to one among the predetermined number of frames received after the I frame, or when the number of consecutive erroneous frames is greater than the threshold value.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other aspects, features and advantages of the present invention will be more apparent from the following detailed description taken in conjunction with the accompanying drawings, in which.

DETAILED DESCRIPTION

An apparatus and operation method according to one exemplary embodiment of the present invention will be described in detail with reference to the accompanying drawings. In the description, many particular items such as a detailed component device are shown, but these are described to provide a general understanding of the present invention. It will be understood by those skilled in the art that various changes in form and detail may be made to the invention described and that such changes in form and detail have been contemplated and considered within the scope of the present invention. In the following description, a detailed description of known functions and configurations incorporated herein will be omitted when it may make the subject matter of the present invention rather unclear.

When an error occurs in a moving picture frame during reception of the moving picture frame, and thus the frame is lost, a frame error concealment method may be used. The frame error concealment method is to recover an erroneous frame to be as similar to the original image as possible by using a frame received before the erroneous frame, and to minimize error propagation to frames received after the error has occurred, thereby enabling the decoding to be normally achieved. However, when an error occurs in a frame directly after an I frame, since error propagation becomes more serious, the quality of the image is degraded even though the error concealment method is used. Also, when erroneous frames are consecutively received due to a poor reception state, use of the error concealment technique causes serious distortion of an image.

Therefore, the present invention proposes a method for determining the degree of error and selectively using a frame freeze technique and/or an error concealment technique when an erroneous frame is received during transmission/reception of moving picture data.

An error concealment apparatus for a moving picture frame according to an exemplary embodiment of the present invention will be described with reference to FIG. 3.

Figure 1:
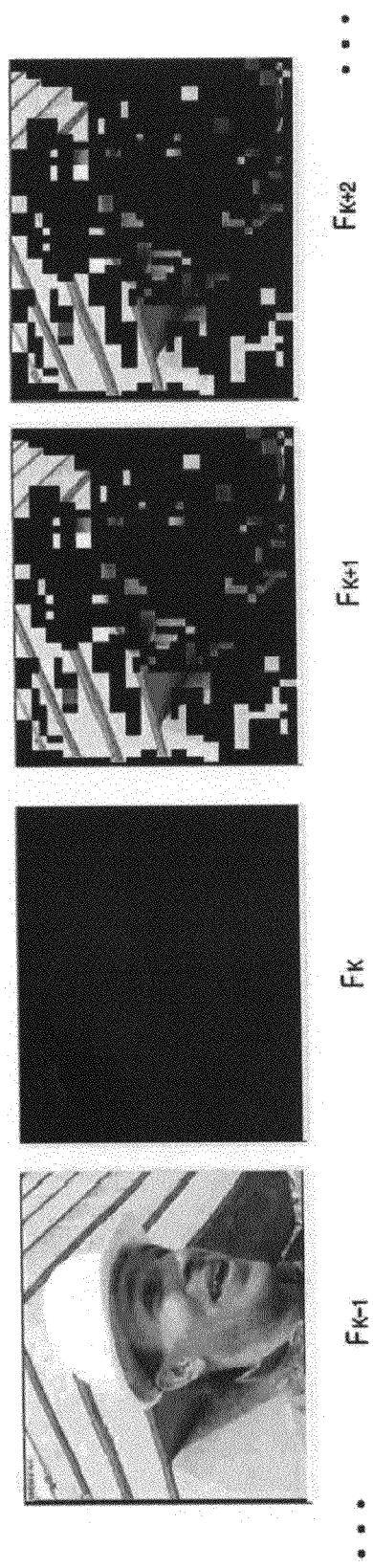
FIG. 1 is a view illustrating frames output after an error occurs in a frame during decoding of a moving picture.
Figure 2:
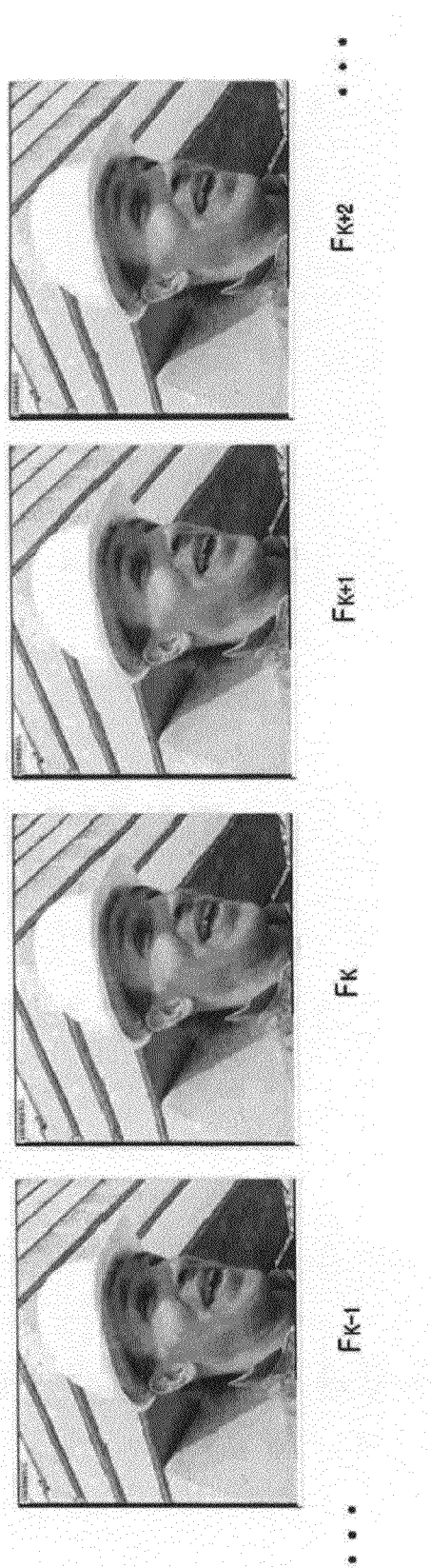
FIG. 2 is a view illustrating frames output after an error occurs in a frame, when a moving picture is decoded using a general frame freeze technique.
Figure 3:
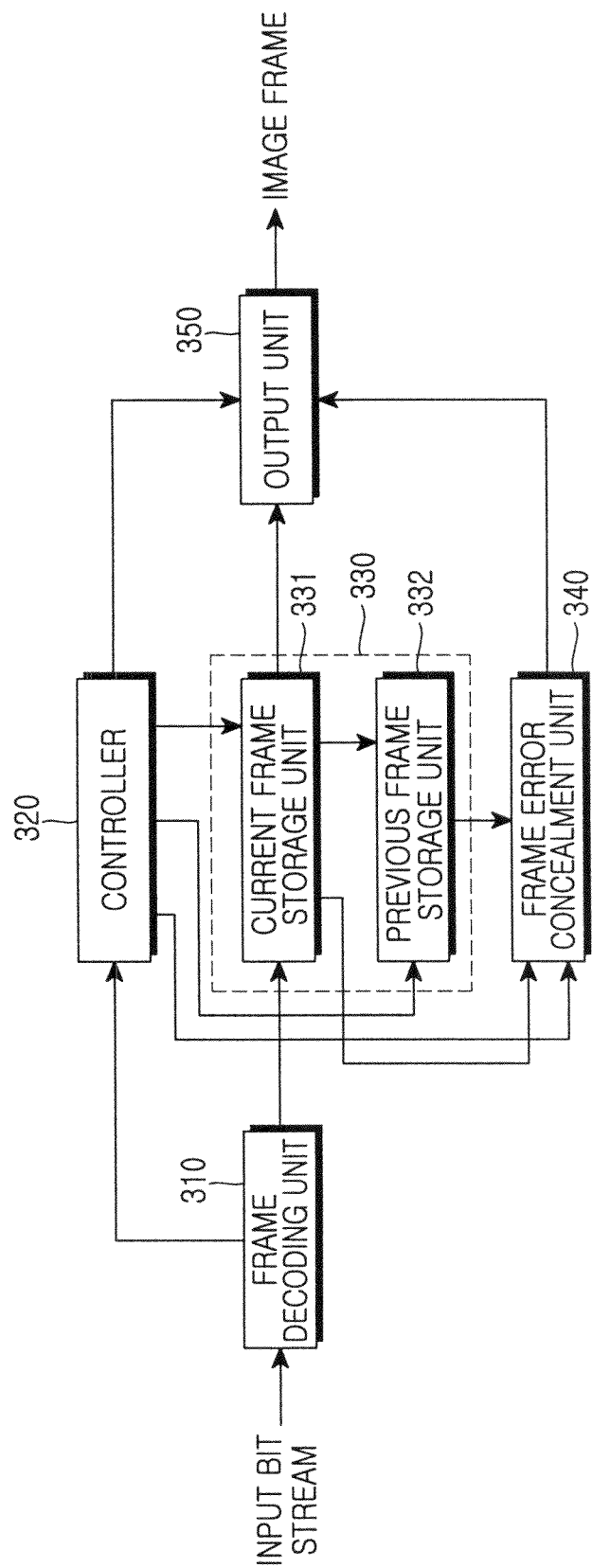
FIG. 3 is a block diagram illustrating the configuration of a moving picture frame error concealment apparatus according to an exemplary embodiment of the present invention.

FIG. 3 is a block diagram illustrating the configuration of a moving picture frame error concealment apparatus according to an exemplary embodiment of the present invention. The frame error concealment apparatus according to an exemplary embodiment of the present invention includes a frame decoding unit 310 for decoding a bit stream of an input image frame and determining if an error occurs in the decoded image frame, a buffer unit 330 for temporarily storing a previously decoded frame (i.e. previous frame) and a currently decoded frame (i.e. current frame), which have been received from the frame decoding unit, a controller 320 for controlling each component during performance of a frame error concealment function, a frame error concealment unit 340 for generating a recovery frame similar to an original image through use of a previously normally received frame when an error exists in an input image frame, and an output unit 350 for receiving an image frame input without error from the buffer unit 330 and outputting the received image frame without change, and for outputting the recovery frame generated by the frame error concealment unit 340 when an error exists in an input frame.

The components and operation of the frame error concealment apparatus will now be described in detail with reference to FIG. 3. A bit stream of an image signal is input to the frame decoding unit 310. The frame decoding unit 310 decodes data of the input bit stream according to an encoding scheme of the data. The encoding scheme may be one among H.263, H.264, MPEG-1, MPEG-2, MPEG-3, MPEG-4, etc., which are general international standards. The frame decoding unit 310 performs a decoding operation on the data of an input frame according to such an encoding scheme, and outputs the decoded data to the buffer unit 330.

The buffer unit 330 includes a current frame storage unit 331 for storing an image frame input from the frame decoding unit 310, and a previous frame storage unit 332 for receiving and storing data, which has been stored in the current frame storage unit 331, when a next frame is input to the current frame storage unit 331. A frame stored in the previous frame storage unit 332, as described above, is used as data for concealing an error when the error occurs in a frame.

Also, the frame decoding unit 310 generates an error occurrence signal according to a result of decoding of the frame, and outputs the error occurrence signal to the controller 320.

The error occurrence signal according to a result of decoding of a frame carries information regarding an erroneous frame to the controller 320 when an error is detected.

When receiving an error occurrence signal, representing that an error has occurred in a received frame, from the frame decoding unit 310, the controller 320 determines a degree of error, and controls either a frame freeze technique or a predetermined error concealment technique to be used. Also, the controller 320 controls the buffer unit 330 and the frame error concealment unit 340 so as to generate a recovery frame to be substituted for an erroneous frame by using a macro block of a previous frame. In addition, the controller 320 controls the recovery frame to be substituted for the erroneous frame, and controls the output unit 350 to output the recovery frame.

In contrast, when receiving a frame without error, the controller 320 controls the received frame to be directly output.

The previous frame storage unit 332 receives and stores the current image frame. When a frame input to the frame decoding unit 310 includes an error, the previous frame storage unit 332 can store an error-concealed frame output from the output unit 350, that is, a recovery frame newly generated to conceal the erroneous frame.

When an error occurs in an input frame, and the frame is lost, the frame error concealment unit 340 generates a new recovery frame by making reference to a previously input frame. In this case, the recovery frame corresponds to a recovery frame based on a predetermined error concealment technique, or to a previous frame received without error based on a frame freeze technique, depending on a degree of error determined in the erroneous frame.

When receiving an image frame input without error from the buffer unit 330, the output unit 350 outputs the received image frame without change. In addition, when an error occurs in an input frame, the output unit 350 outputs the recovery frame generated by the frame error concealment unit.

Figure 4:
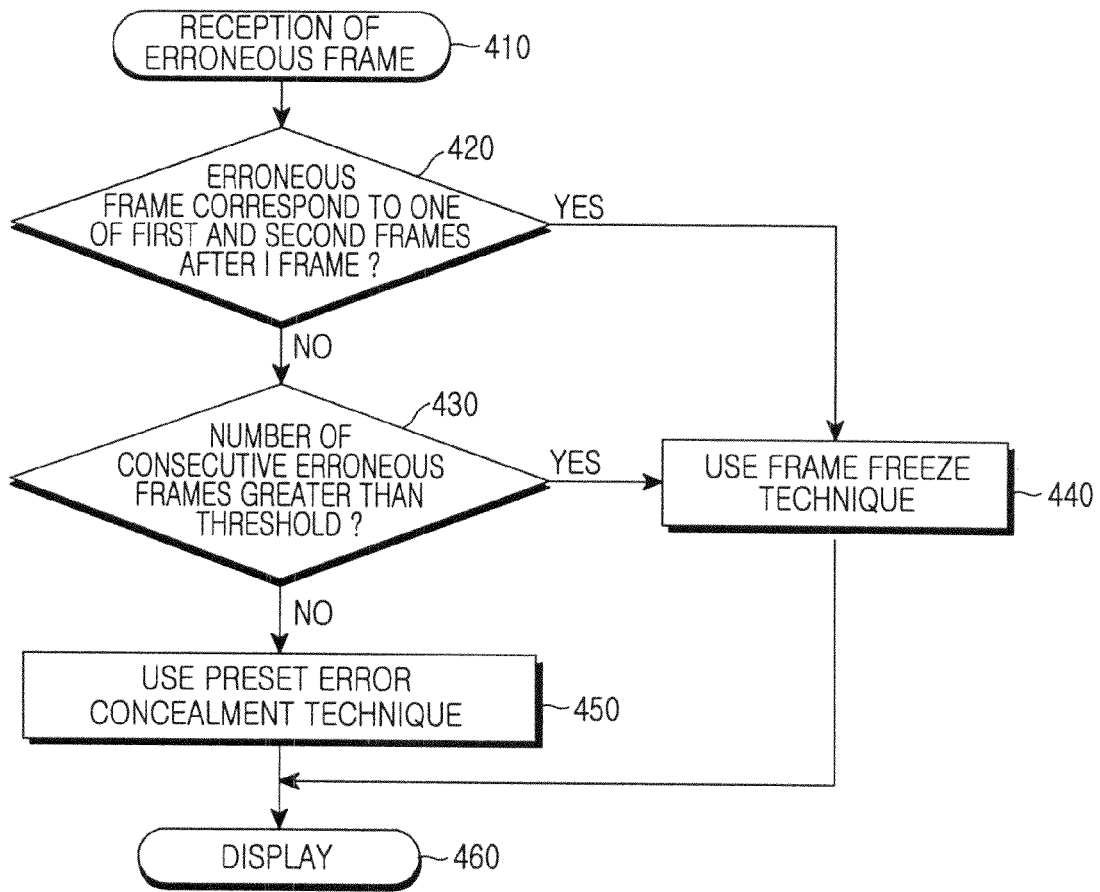
FIG. 4 is a flowchart illustrating the error concealment operation for a moving picture frame according to an exemplary embodiment of the present invention.

FIG. 4 is a flowchart illustrating the error concealment operation for a moving picture frame according to an exemplary embodiment of the present invention. First, when a moving picture frame including an error is received in step 410, step 420 is performed to determine if the received erroneous frame corresponds to one of first and second frames after an I frame. When the received erroneous frame does not correspond to one of the first and second frames after an I frame as a result of the determination, step 430 is performed to determine if the number of consecutive erroneous frames is greater than a threshold value. When the number of consecutive erroneous frames is not greater than the threshold value as a result of the determination, step 450 is performed to use a predetermined error concealment technique, and then step 460 is performed. Then, in step 460, a moving picture frame error-concealed through step 450 is displayed.

The error concealment technique used in step 450 may be an existing error concealment technique in which an erroneous frame is recovered by making reference to a frame received before the error occurs. Preferably, a frame error concealment method of selecting a macro block, which is located at the same position as that of a macro block to be recovered, and adjacent macro blocks thereof in a frame received before the error occurs, generating a recovery frame similar to the original frame by recovering the erroneous frame in units of macro blocks through use of pixel values and motion vectors of the selected macro blocks, and concealing the erroneous frame through use of the recovery frame, so as to minimize error propagation occurring in frames after the error occurs, may be used. An example of an error concealment method is described in an "Overlapped Block Error Concealment method," which has been published as a paper and applied for a patent in Korea (Published as a Paper in 2006 Fall Science Meeting, Publication Date: Nov. 25, 2006, Title: Error Concealment of H.264 Video Frame, Author: Kwanwoong Song et al.) (Korean Patent Application No. 10-2007-11554, Application Date Feb. 5, 2007, Assignee: Samsung Electronics Co., Ltd. Korea University Industrial & Academic Collaboration Foundation, Title: Error Concealment Method And Apparatus For Frame Upon Decoding Of Moving Picture, Inventor: Kwanwoong Song et al.).

When a frame including an error corresponds to one of first and second frames directly after an I frame, error propagation becomes serious. Therefore, in this case, it is more effective to use a frame freeze method than using the error concealment method. Accordingly, when the erroneous frame received in step 420 corresponds to one of the first and second frames after an I frame, step 440 is performed to use the frame freeze technique, and then step 460 is performed to display a corresponding frame. In addition, even when it is determined in step 430 that the number of consecutive erroneous frames is greater than the threshold value, step 440 is performed to use the frame freeze technique, and then step 460 is performed to display a corresponding frame.

If the error concealment technique is used when erroneous frames are consecutively received due to a poor reception state, an image is seriously distorted, so that a viewer may feel inconvenience. Therefore, it is important to set a threshold value that allows information to be transferred while concealing errors within the limit where the viewer is not inconvenienced. Generally, in the case of a moving picture having much motion, even when a small number of frames is lost, it is difficult to conceal errors. In contrast, in the case of a moving picture having small motion, although a large number of frames is lost, it is possible to conceal errors without inconveniencing the viewers.

Through use of the facts as described above, a method of obtaining the threshold value may be expressed as equation 1 below.

$$\text{Threshold} = a \Bigg/ \sum \frac{\sum_{x,y}^{m,n} (\text{abs}(MVx) + \text{abs}(MVy))}{\text{Number of } MBs} \tag{1}$$

In equation 1, "Number of MBs" represents the number of macro blocks existing in one frame, "MVx" represents a motion vector value in the x direction, "MVy" represents a motion vector value in the y direction, and "a" represents a known coefficient, which may be preset.

The coefficient "a" is a preset correction value to obtain an optimal threshold value. In order to obtain the threshold value, a degree of motion is identified by adding the absolute values of x-direction and y-direction motion vectors of all macro blocks existing in one frame, and dividing the sum of the absolute values by the number of macro blocks. Information on the degree of motion is consecutively accumulated until the current time, and the accumulated value is used to obtain a threshold value through multiplication by a certain coefficient. Whenever a new I frame is received, the threshold value is initialized and newly calculated. As a moving picture has more motion, a lower threshold value is obtained, so that even when a small number of erroneous frames is consecutively received, an image is displayed using a frame freeze method.

Figure 5:
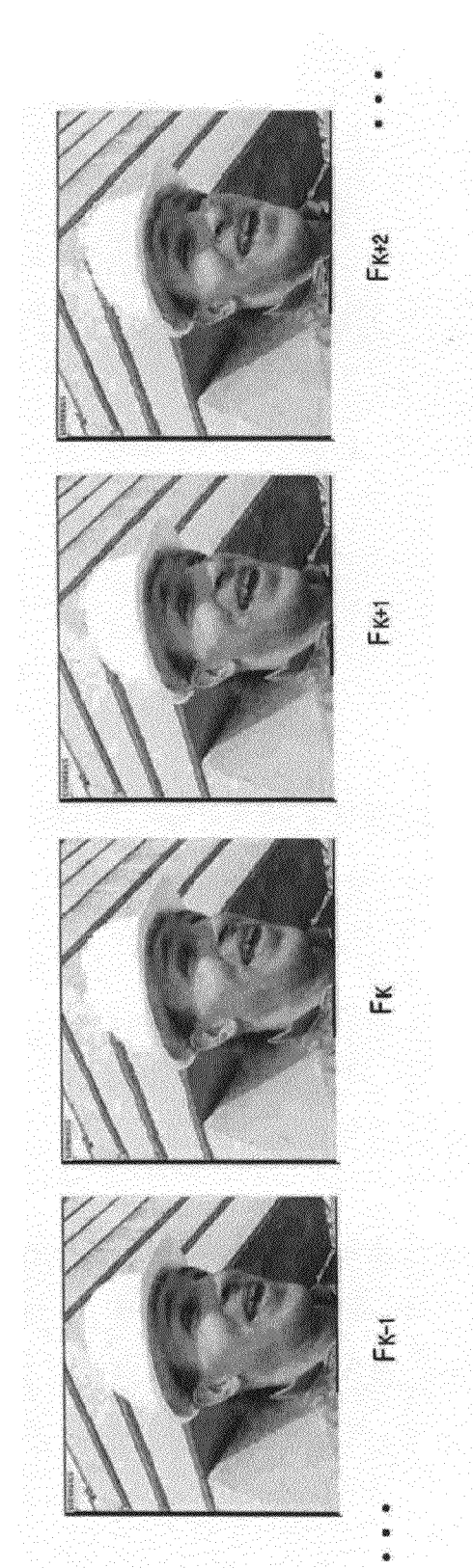
FIG. 5 is a view illustrating frames output after an erroneous frame occurs when a moving picture is decoded using an error concealment method for a moving picture frame according to an exemplary embodiment of the present invention.

FIG. 5 is a view illustrating frames output after an erroneous frame occurs when a moving picture is decoded using an error concealment method for a moving picture frame according to an exemplary embodiment of the present invention. Referring to FIG. 5, showing a result of recovery for images including an $F_K$ frame in which an error occurs, it can be understood that the error is hardly propagated to images decoded using the error concealment technique after the erroneous frame occurs. If errors consecutively occur in a plurality of frames, or the threshold value is calculated to be a low value because an image has too much motion, the image will be displayed using the frame freeze method.

The operation and configuration of the error concealment method and apparatus for a moving picture frame according to an exemplary embodiment of the present invention may be implemented as described above. Meanwhile, while the present invention has been shown and described with reference to certain exemplary embodiments thereof, various changes in form and details may be made therein without departing from the scope of the invention. For example, step 420 in FIG. 4 may be appropriately changed from a step of determining if an erroneous frame corresponds to one of the first and second frames after an I frame, to either a step of determining if an erroneous frame corresponds to the first frame after an I frame, or to a step of determining if an erroneous frame corresponds to one among the first to third frames after an I frame.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

According to the present invention, when an erroneous frame is received during transmission/reception of moving picture data, an error in image information is sensed through the error concealment method for frames, and the error concealment technique or the frame freeze technique are selectively used according to a degree of error, so that it is possible to maximize utilization of received image information, and it is possible to provide moving pictures of higher quality to viewers.

What is claimed is:

1. A selective frame error concealment method for a moving picture frame, the method comprising the steps of:
   determining when an erroneous frame corresponds to one among a predetermined number of frames received after an I frame when the erroneous frame is received during reception of moving picture frames;
   determining if a number of consecutive erroneous frames is greater than a preset threshold value when the erroneous frame does not correspond to one among the predetermined number of frames received after the I frame;
   using an error concealment technique when the number of consecutive erroneous frames is equal to or less than the threshold value; and
   displaying a frame, which has been received without error before the erroneous frame, until receiving a new I frame, either when the erroneous frame corresponds to one among the predetermined number of frames received after the I frame, or when the number of consecutive erroneous frames is greater than the threshold value;
wherein the threshold value is obtained by:

$$\text{Threshold} = a \Big/ \sum \frac{\sum_{x,y}^{m,n}(\text{abs}(MVx) + \text{abs}(MVy))}{\text{Number of } MBs},$$

wherein "Threshold" represents the threshold value,
   "Number of MBs" represents the number of macro blocks existing in one frame,
   "MVx" represents a motion vector value in an X direction,
   "MVy" represents a motion vector value in a Y direction, and
   "a" represents a preset coefficient.

2. The method as claimed in claim 1, wherein, the predetermined number of frames received after the I frame, corresponds to one of a first and a second frame received after the I frame.

3. The method as claimed in claim 1, wherein, when a frame is received without error during reception of moving picture frames, the received frame is displayed.

4. The method as claimed in claim 1, wherein the threshold value is re-calculated whenever a new I frame is received.

5. An apparatus for concealing a frame error upon decoding of a moving picture, the apparatus comprising:
   a frame decoding unit for decoding a bit stream of an input encoded frame, and determining if an error occurs in the decoded frame;
   a buffer unit for temporarily storing a previously decoded frame and a currently decoded frame, which have been received from the frame decoding unit;
   a controller for controlling each component during performance of a frame error concealment function;
   a frame error concealment unit for generating a recovery frame using an error concealment technique based on a previously received frame when an error occurs in said currently decoded frame; and
   an output unit for outputting an image frame input from the buffer unit, without change, when the image frame is input without error, and outputting the recovery frame generated by the frame error concealment unit when an error occurs in an input frame,
   wherein the frame error concealment unit determines the recovery frame as one of 1. a previously received error-free frame if a first condition occurs in which said erroneous frame corresponds to one among a predetermined number of frames received after an I frame or if a second condition occurs in which a number of consecutive erroneous frames is greater than a threshold value when the first condition does not occur, and 2. a frame determined by the error concealment technique when neither the first condition nor the second condition occurs;
   wherein the threshold value is obtained by:

$$\text{Threshold} = a \Big/ \sum \frac{\sum_{x,y}^{m,n}(\text{abs}(MVx) + \text{abs}(MVy))}{\text{Number of } MBs},$$

wherein "Threshold" represents the threshold value,
"Number of MBs" represents the number of macro blocks existing in one frame,
"MVx" represents a motion vector value in an X direction,
"MVy" represents a motion vector value in a Y direction, and
"a" represents a preset coefficient.

6. The apparatus as claimed in claim 5, wherein the predetermined number of frames received after the I frame, corresponds to one of a first and a second frame received after the I frame.

7. The apparatus as claimed in claim 5, wherein the buffer unit comprises:
a current frame storage unit for storing the current frame input from the frame decoding unit; and
a previous frame storage unit for storing the previous frame.

8. The apparatus as claimed in claim 5, wherein, when receiving a frame without error during reception of moving picture frames, the controller controls the received frame to be displayed.

9. A computer-readable recording medium having stored thereon instructions which when executed by a processor causes a moving picture receiving apparatus to:
determine when an erroneous frame corresponds to one among a predetermined number of frames received after an I frame when the erroneous frame is received during reception of moving picture frames;
determine if a number of consecutive erroneous frames is greater than a preset threshold value when the erroneous frame does not correspond to one among the predetermined number of frames received after the I frame;
use an error concealment technique when the number of consecutive erroneous frames is equal to or less than the threshold value; and
output a frame for current display, which has been received without error before the erroneous frame, until receiving a new I frame, either when the erroneous frame corresponds to one among the predetermined number of frames received after the I frame, or when the number of consecutive erroneous frames is greater than the threshold value;

wherein said threshold is determined as:

$$\text{Threshold} = a \Big/ \sum \frac{\sum_{x,y}^{m,n}(\text{abs}(MVx) + \text{abs}(MVy))}{\text{Number of } MBs},$$

wherein "Threshold" represents the threshold value,
"Number of MBs" represents the number of macro blocks existing in one frame,
"MVx" represents a motion vector value in an X direction,
"MVy" represents a motion vector value in a Y direction, and
"a" represents a preset coefficient.

10. The recording medium as recited in claim 9, wherein the threshold value is re-calculated dynamically as a function of motion vector values of the moving picture frames.

11. The recording medium as recited in claim 9, wherein said predetermined number of frames is in the range of one to three frames.

12. The recording medium as recited in claim 9, wherein said threshold is recalculated after receipt of each of said at least one "I" frame.

13. The recording medium as recited in claim 9, wherein said error concealment technique is performed on a macroblock basis with reference to a previously received error-free frame.

14. The apparatus as recited in claim 5, wherein said error concealment technique is performed on a macroblock basis with reference to a previously received error-free frame.

15. The method as recited in claim 1, wherein the error concealment technique is performed on a macroblock basis with reference to a previously received error-free frame.

16. The method as recited in claim 1, wherein the threshold value is re-calculated dynamically as a function of motion vector values of the moving picture frames.

17. The apparatus as recited in claim 5, wherein the threshold value is re-calculated dynamically as a function of motion vector values of the moving picture frames.

* * * * *